Aug. 19, 1941.                C. A. MORSS                2,252,778
                    ANTISKID CHAIN FOR AUTOMOBILE TIRES
                         Filed June 3, 1940

Inventor:
Charles A. Morss
By Dike, Calver & Gray,
Attorneys.

UNITED STATES PATENT OFFICE 2,252,778

ANTISKID CHAIN FOR AUTOMOBILE TIRES

Charles A. Morss, West Hartford, Conn.

Application June 3, 1940, Serial No. 338,475

2 Claims. (Cl. 152—213)

My invention relates to an improvement in anti-skid chains for automobile tires.

It is an object of my invention to provide tire chains which may be put on or taken off without raising the wheel or moving the vehicle during any part of the operation. It is also an object to prevent looseness or flapping of the chain caused by centrifugal force.

I am aware that there are many known devices, most of which are not practicable or commercially available to the public, which purport to fulfill several of the requirements with which I am now concerned. Those now known to me do not, however, employ the combination of means which I now provide, nor do they perform satisfactorily the function desired.

The invention will be best understood from the following description in conjunction with the accompanying drawing. It is to be understood that the invention is not limited to the details of construction and arrangement of parts illustrated in the drawing, since the invention as defined by the claims hereinafter appended, may be otherwise embodied without departure from the spirit and scope thereof.

It is also to be understood that the terms here used are for the purpose of description and not of limitation, and it is not intended to limit the invention claimed herein beyond the requirements of the prior art.

Figure 3:
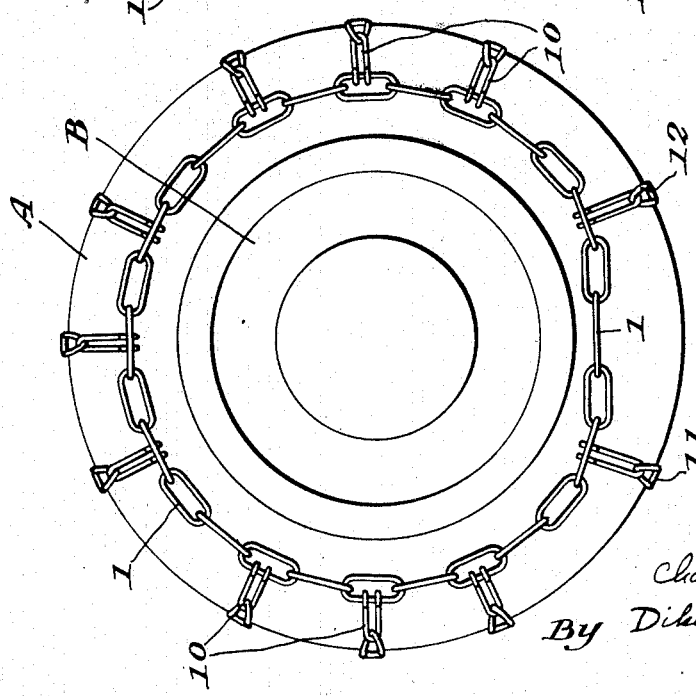
Fig. 3 is a view in side elevation of the inner, or vehicle side of the wheel and tire shown in Fig. 1.
Figure 2:
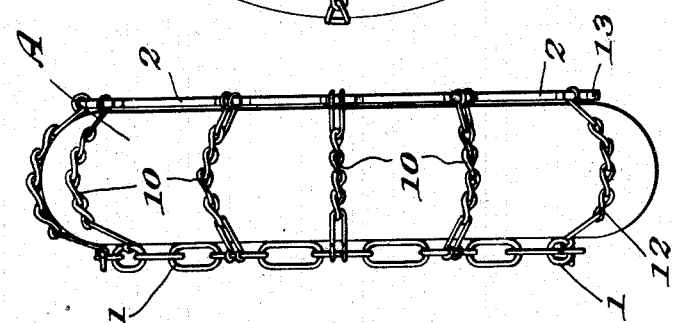
Fig. 2 is a view in end elevation of the same tire and non-skid device.
Figure 1:
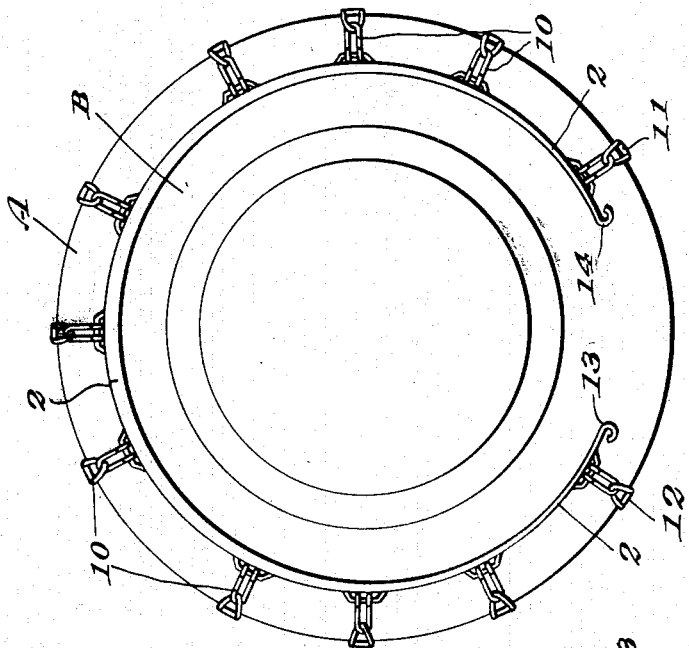
Fig. 1 is a view in side elevation showing a device embodying my invention placed in operative position on the tire of an automobile wheel. The side shown is the outer portion of the wheel, away from the vehicle.

The device has three principal elements: there is an endless chain 1 which is placed against the face or outside wall of a tire A mounted on a wheel B, there is a crescent shaped spring 2 which is placed against the inner, or vehicle, side of the tire A, and there is a plurality of cross-chains 10 connecting the endless chain 1 and the crescent spring 2 and passing over the tread of the tire A. No definite number of these cross-chains is required. Two of these chains, such as the chains 11 and 12, must be spaced so that when the portion of the tire between them is rested on the ground, they will remain free to move. The relative position of the remaining cross-chains, so long as they are spaced sufficiently to provide reasonable uniformity of gripping surfaces and reasonable tension on the chain 1, is not critical.

The crescent spring 2 is quite small in cross-section at the tips 13 and 14, but the thickness of the spring increases steadily until it reaches its maximum at a point approximately equidistant from the tips. This variation is to provide equal stress at all sections so that the spring will be stiff enough to require no fastening at the ends. The tips are preferably rounded or curved to prevent possible damage to the tire.

When my tire chain is applied, it is not necessary to raise the tire from the ground or to move the vehicle. The crescent spring is expanded and passed over the tire with the tips extending downwardly as shown in Fig. 3. In this manner, cross chains 11 and 12, which are fastened to the spring 2 near the tips 13 and 14, can pass about the tread of the tire without hindrance.

In operation, the major part of the pull from the cross chains due to the driving force will be taken by the inexpansible, continuous chain 1, for when the cross-chains come between the tire and the ground they cannot readily be drawn transversely across the tread of the tire. Therefore the greater part of the pull will come on the unyielding outer chain 1 rather than on the crescent spring 2, which holds the cross-chains tightly to the tire against centrifugal force as the wheel revolves, and provides enough tension when the cross-chains are under strain so that they cannot slip transversely over the tread, but are held by the contracting spring.

1. An anti-skid device for vehicle tires comprising a continuous inexpansible outer chain and an inner crescent shaped contracting spring having separated unconnected ends, and a plurality of cross-chains connecting said outer chain and said spring.

2. An anti-skid device for vehicle tires comprising, in combination, side members joined by a series of spaced cross members, one of said side members comprising a crescent-shaped spring adapted to exert substantially constant force to hold said cross members under tension.

CHARLES A. MORSS.